United States Patent
Sims et al.

(10) Patent No.: US 10,621,341 B2
(45) Date of Patent: Apr. 14, 2020

(54) CROSS PLATFORM USER EVENT RECORD AGGREGATION SYSTEM

(71) Applicant: BANK OF AMERICA CORPORATION, Charlotte, NC (US)

(72) Inventors: Scott Anderson Sims, Tega Cay, SC (US); Kolt Arthur Bell, Charlotte, NC (US); Michael Joseph Carroll, Orland Park, IL (US); Elliot Piatetsky, New York, NY (US); Stephen M. Schneeweis, Hockessin, DE (US); Craig D. Widmann, Chandler, AZ (US); Dharmender Kumar Satija, Rye Brook, NY (US); Sai Kishan Alapati, Princeton Junction, NJ (US)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 15/798,159

(22) Filed: Oct. 30, 2017

(65) Prior Publication Data

US 2019/0130098 A1 May 2, 2019

(51) Int. Cl.
*G06F 21/00* (2013.01)
*G06F 21/55* (2013.01)
*G06N 20/00* (2019.01)
*H04L 29/06* (2006.01)

(52) U.S. Cl.
CPC .......... *G06F 21/554* (2013.01); *G06F 21/552* (2013.01); *G06N 20/00* (2019.01); *H04L 63/1433* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,882,988 B2 | 4/2005 | Subbu et al. |
| 7,266,839 B2 | 9/2007 | Bowers et al. |
| 7,603,709 B2 | 10/2009 | Lewis et al. |
| 8,166,553 B2 | 4/2012 | Kubota |

(Continued)

OTHER PUBLICATIONS

Jason Fitzpatrick, "Why does RAM have to be volatile?" 2014, 4 pages, (Year: 2014).
NPL Search Results (Year 2020).

*Primary Examiner* — Andrew J Steinle
(74) *Attorney, Agent, or Firm* — Michael A. Springs; Moore & Van Allen PLLC; Anup Shrinivasan Iyer

(57) ABSTRACT

Systems, computer program products, and methods are described herein for cross platform user event record aggregation system. The present invention is configured to receive one or more exposure events from one or more detection systems; determine that a combination of at least a portion of the one or more exposure events indicates an intrusion in at least one of the one or more detection systems, thereby requiring elevated review of each exposure event; initiate the elevated review based on at least the indication of the intrusion; determine whether the intrusion is benign or harmful; and re-train the machine learning algorithm based on at least determining whether the intrusion is benign or harmful, thereby adjusting the score for future incidents of each exposure event in the combination of at least a portion of the one or more exposure events.

20 Claims, 9 Drawing Sheets

(56) References Cited

U.S. PATENT DOCUMENTS

| | | |
|---|---|---|
| 8,201,256 B2 | 6/2012 | Patanella |
| 8,239,677 B2 | 8/2012 | Colson |
| 8,683,591 B2 | 3/2014 | Wittenschlaeger |
| 8,763,127 B2 | 6/2014 | Yao et al. |
| 9,798,883 B1 * | 10/2017 | Gil .................. G06F 21/577 |
| 2002/0112190 A1 | 8/2002 | Miyagawa et al. |
| 2002/0133603 A1 | 9/2002 | Mitomo et al. |
| 2002/0133606 A1 | 9/2002 | Mitomo et al. |
| 2002/0135610 A1 | 9/2002 | Ootani et al. |
| 2003/0023655 A1 | 1/2003 | Sokolov et al. |
| 2003/0033541 A1 | 2/2003 | Edmark et al. |
| 2003/0046583 A1 | 3/2003 | Goldman et al. |
| 2003/0051026 A1 | 3/2003 | Carter et al. |
| 2003/0084318 A1 | 5/2003 | Schertz |
| 2003/0084340 A1 | 5/2003 | Schertz et al. |
| 2003/0084349 A1 | 5/2003 | Friedrichs et al. |
| 2003/0088680 A1 | 5/2003 | Nachenberg et al. |
| 2003/0110396 A1 | 6/2003 | Lewis et al. |
| 2003/0172291 A1 | 9/2003 | Judge et al. |
| 2003/0187977 A1 | 10/2003 | Cranor et al. |
| 2003/0221123 A1 | 11/2003 | Beavers |
| 2004/0230677 A1 | 11/2004 | O'Hara |
| 2007/0169194 A1 | 7/2007 | Church et al. |
| 2009/0326731 A1 | 12/2009 | Bowdry et al. |
| 2012/0260331 A1 | 10/2012 | Aaron |
| 2013/0097658 A1 | 4/2013 | Cooper et al. |
| 2013/0309154 A1 | 11/2013 | Call et al. |
| 2015/0074258 A1 | 3/2015 | Ferreira et al. |
| 2015/0106260 A1 | 4/2015 | Andrews et al. |
| 2015/0128274 A1 | 5/2015 | Giokas |
| 2015/0172321 A1 | 6/2015 | Kirti et al. |
| 2015/0229625 A1 | 8/2015 | Grigg et al. |
| 2015/0302411 A1 | 10/2015 | Bondesen et al. |
| 2015/0319185 A1 * | 11/2015 | Kirti .................. H04L 63/1416 726/23 |
| 2016/0112443 A1 | 4/2016 | Grossman et al. |
| 2016/0191476 A1 * | 6/2016 | Schutz .................. H04L 63/06 713/165 |
| 2016/0308890 A1 | 10/2016 | Weilbacher |
| 2017/0006019 A1 | 1/2017 | Addala et al. |
| 2017/0093829 A1 | 3/2017 | Gitlin et al. |
| 2017/0289187 A1 | 10/2017 | Noel et al. |
| 2018/0063182 A1 | 3/2018 | Jones et al. |
| 2018/0124082 A1 | 5/2018 | Siadati et al. |
| 2018/0219914 A1 | 8/2018 | Reith et al. |
| 2018/0247218 A1 | 8/2018 | Fiumara et al. |
| 2018/0248895 A1 | 8/2018 | Watson et al. |
| 2019/0116193 A1 | 4/2019 | Wang et al. |
| 2019/0259033 A1 | 8/2019 | Reddy et al. |

* cited by examiner

CROSS PLATFORM USER EVENT RECORD AGGREGATION SYSTEM

FIELD OF THE INVENTION

The present invention embraces a system for aggregating user event record cross multiple platforms in a technology environment.

BACKGROUND

Traditional methods of data analysis have long been used to detect intrusive behavior in a technology environment. This often includes identifying instances or incidents involving repeated transgressions using same or similar methods. Typically, every organization has multiple independent departments that work together towards a common goal of the organization. Each department integrates its technological infrastructure with intrusion detection systems that are capable of identifying potential intrusive behavior associated with that department. However, in an organization where data is shared and utilized across these departments, there is a need for a system to identify

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for cross platform user event aggregation is presented. The system comprising at least one non-transitory memory device with computer-readable code stored thereon; at least one processing device; and at least one module stored in said memory device and comprising instruction code that is executable by the at least one processing device and configured to cause said at least one processing device to: receive, via a distributed network of servers, one or more exposure events from one or more detection systems, wherein each of the one or more exposure events is associated with a score, wherein the score for each of the one or more exposure events is assigned by a machine learning algorithm; determine that a combination of at least a portion of the one or more exposure events indicates an intrusion in at least one of the one or more detection systems, thereby requiring elevated review of each exposure event in the combination of at least a portion of the one or more exposure events; initiate the elevated review based on at least the indication of the intrusion; determine whether the intrusion is benign or harmful; and re-train the machine learning algorithm based on at least determining whether the intrusion is benign or harmful, thereby adjusting the score for future incidents of each exposure event in the combination of at least a portion of the one or more exposure events.

In some embodiments, determining the combination of at least a portion of the one or more exposure events that indicated the intrusion further comprises: retrieving information associated with the one or more exposure events from the one or more detection systems; storing the information in a centralized data repository until a pattern associated with the intrusion based on the one or more exposure events is detected; and determining the pattern associated with at least a portion of the one or more exposure events, wherein the pattern comprises the combination of at least a portion of the one or more exposure events.

In some embodiments, the module is further configured to: continuously execute statistical analysis algorithms on the one or more exposure events stored in the centralized repository to determine whether the combination of at least a portion of the one or more exposure events is associated with the intrusion.

In some embodiments, the module is further configured to: initiate the elevated review, wherein initiating further comprises moving the one or more exposure events associated with the intrusion from the centralized data repository to a computing device associated with a user; initiate a presentation of a user interface for display on the computing device, wherein the user interface comprises information associated with each exposure event associated with the intrusion; and receive, via the user interface, a user input indicating whether the intrusion is benign or harmful.

In some embodiments, the module is further configured to: initiate the elevated review, wherein initiating further comprises moving the one or more exposure events associated with the intrusion from the centralized data repository to a volatile memory location; deploy one or more assessment applications on the one or more exposure events stored in the volatile memory location, wherein the one or more assessment applications are configured to execute scripts to determine whether the intrusion is benign or harmful; and receive from the one or more assessment application an indication of whether the intrusion is benign or harmful.

In some embodiments, the module is further configured to: establish a communication link between the one or more detection systems and the centralized data repository, wherein establishing further comprises establishing a data channel between each of the one or more detection systems and the centralized data repository.

In some embodiments, receiving the one or more exposure events from the one or more detection systems further comprises: receiving a request to connect to the data channel established between the each of the one or more detection systems and the centralized data repository, wherein the one or more detection systems are previously disconnected from the centralized data repository, wherein the one or more detection systems connect to the data channel based on at least an incidence of a exposure event in the detection system, wherein the exposure event is associated with the one or more exposure events; and connecting the one or more detection systems to the centralized data repository based on at least the received request.

In some embodiments, determining that the intrusion is benign further comprises determining, based on the elevated review, that the intrusion is not an actual threat.

In some embodiments, determining that the intrusion is harmful further comprises determining, based on the elevated review, that the intrusion is an actual threat.

In another aspect, a computer implemented method for cross platform user event aggregation is presented. The system comprising: receiving, via a distributed network of servers, one or more exposure events from one or more detection systems, wherein each of the one or more exposure events is associated with a score, wherein the score for each of the one or more exposure events is assigned by a machine learning algorithm; determining that a combination of at least a portion of the one or more exposure events indicates an intrusion in at least one of the one or more detection systems, thereby requiring elevated review of each exposure event in the combination of at least a portion of the one or more exposure events; initiating the elevated review based on at least the indication of the intrusion; determining whether the intrusion is benign or harmful; and re-training the machine learning algorithm based on at least determining whether the intrusion is benign or harmful, thereby adjusting the score for future incidents of each exposure event in the combination of at least a portion of the one or more exposure events.

In yet another aspect, a computer program product for cross platform user event aggregation is presented. The computer program product comprising a non-transitory computer-readable medium comprising code causing a first apparatus to: receive, via a distributed network of servers, one or more exposure events from one or more detection systems, wherein each of the one or more exposure events is associated with a score, wherein the score for each of the one or more exposure events is assigned by a machine learning algorithm; determine that a combination of at least a portion of the one or more exposure events indicates an intrusion in at least one of the one or more detection systems, thereby requiring elevated review of each exposure event in the combination of at least a portion of the one or more exposure events; initiate the elevated review based on at least the indication of the intrusion; determine whether the intrusion is benign or harmful; and re-train the machine learning algorithm based on at least determining whether the intrusion is benign or harmful, thereby adjusting the score for future incidents of each exposure event in the combination of at least a portion of the one or more exposure events.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
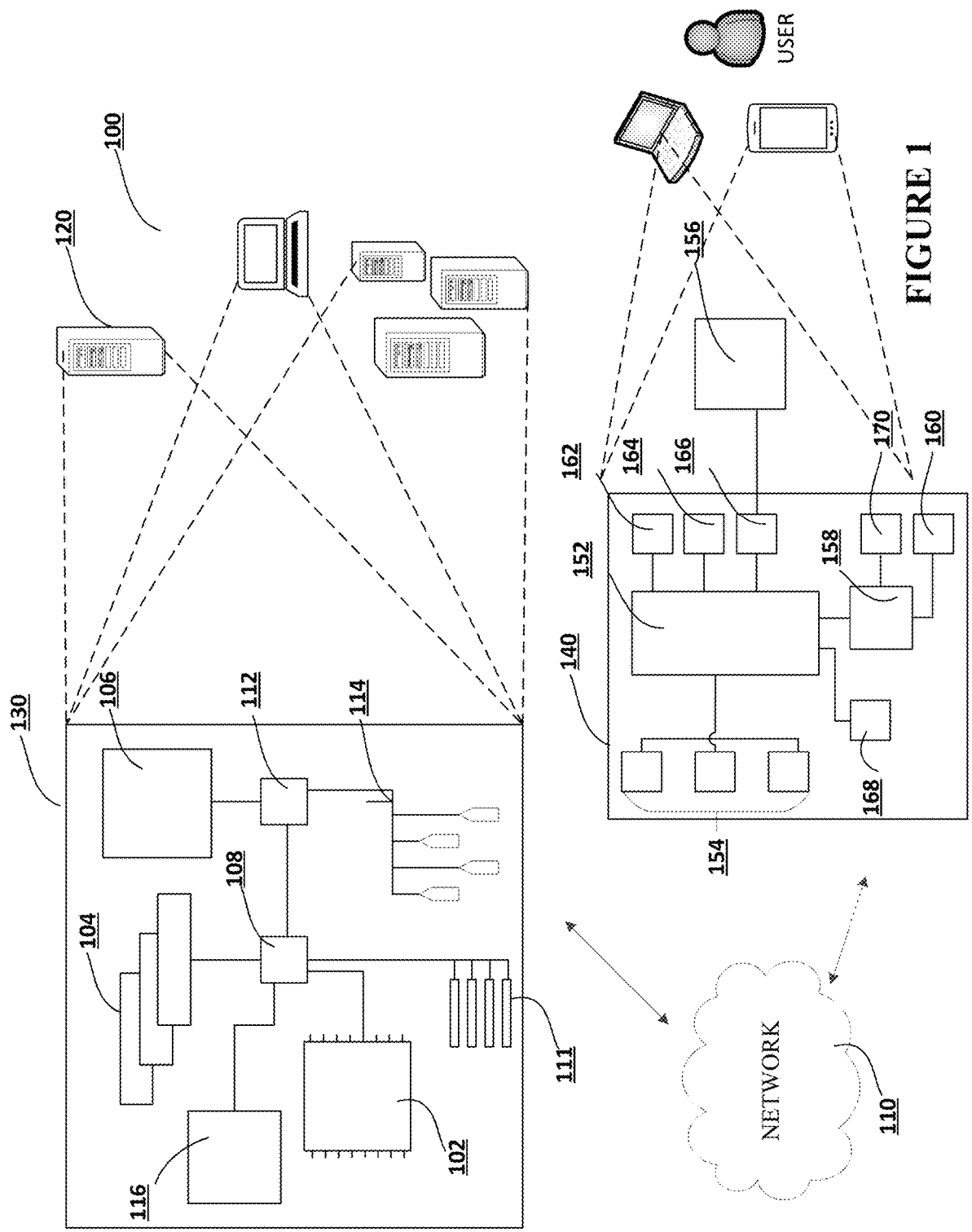
Figure 2:
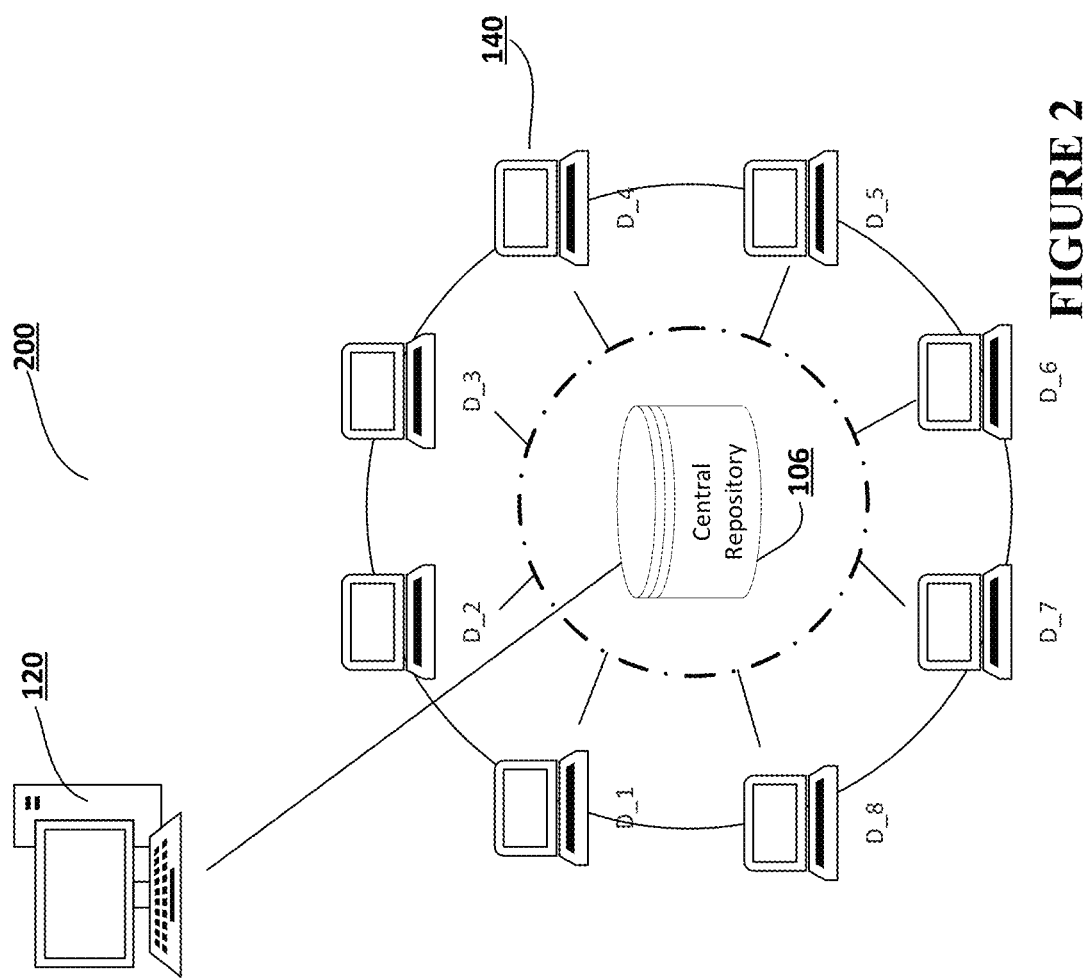
Figure 3:
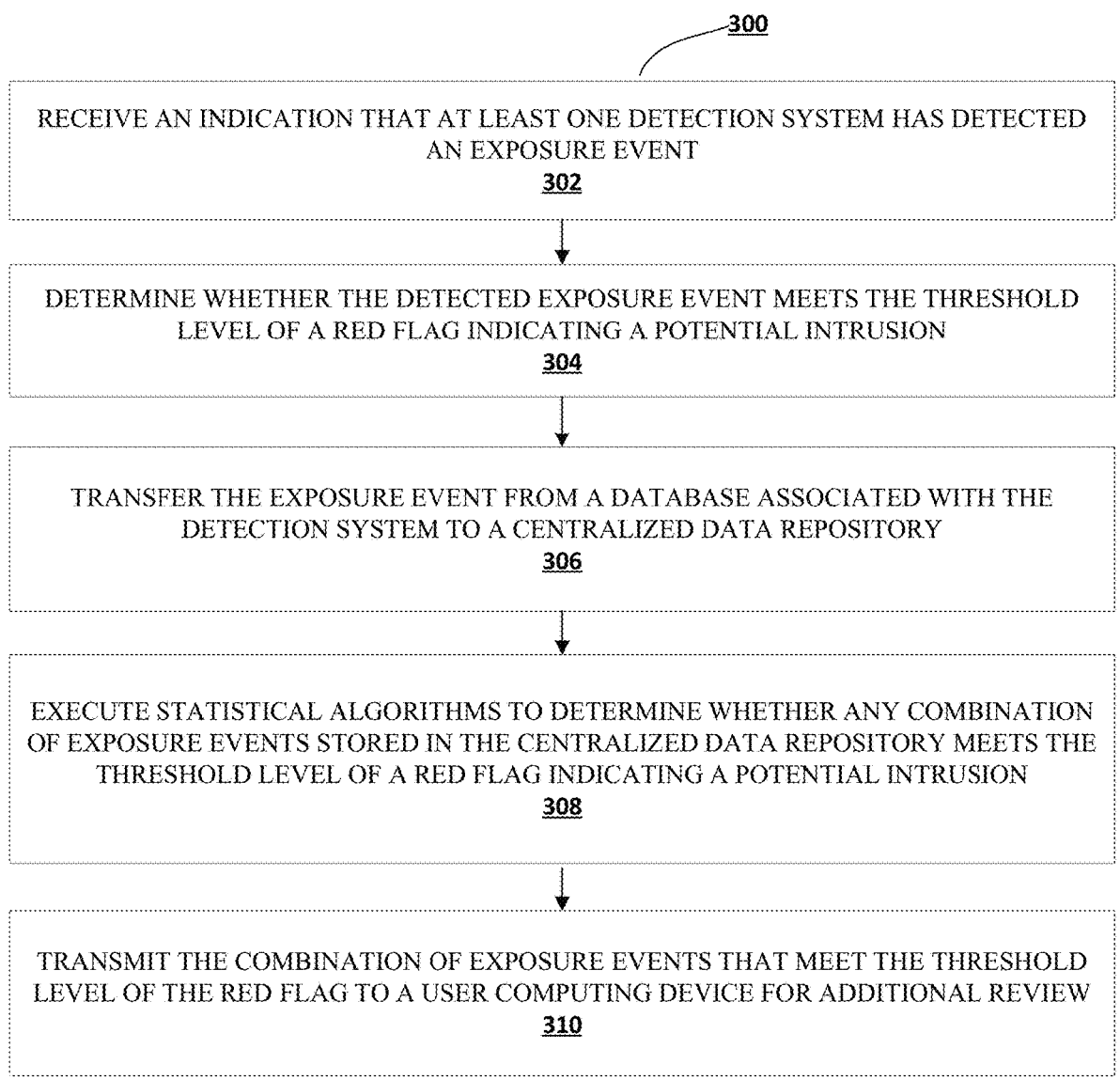
Figure 4:
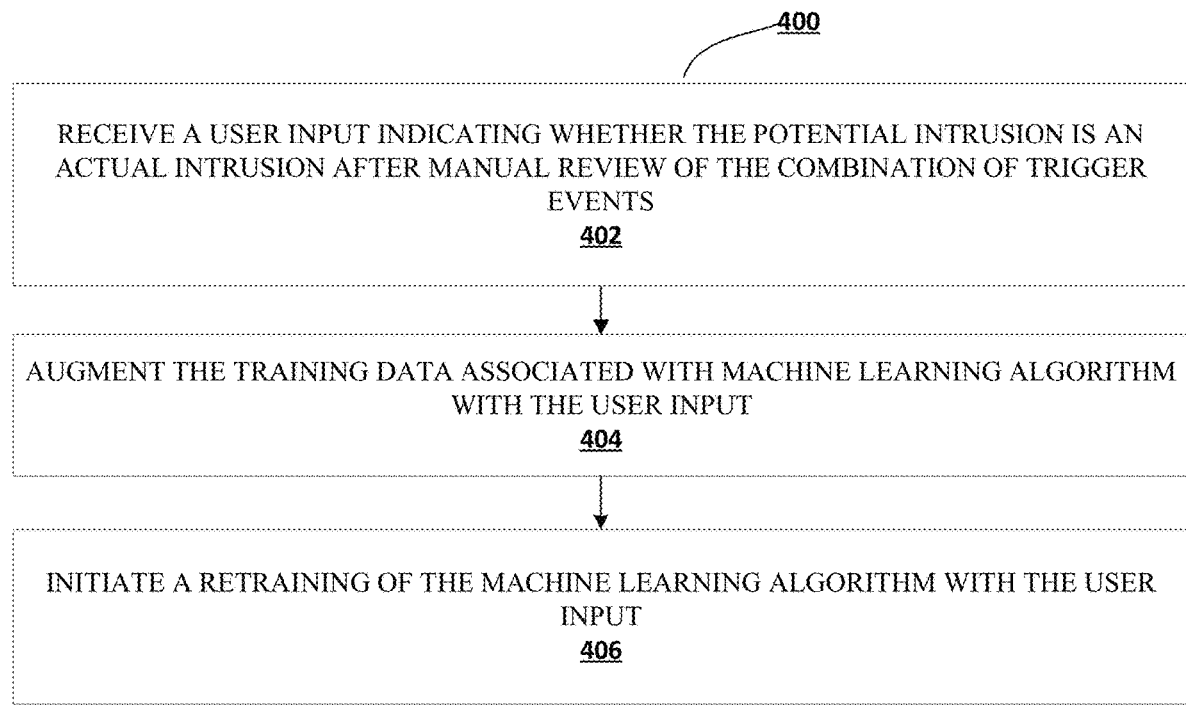
Figure 5A:
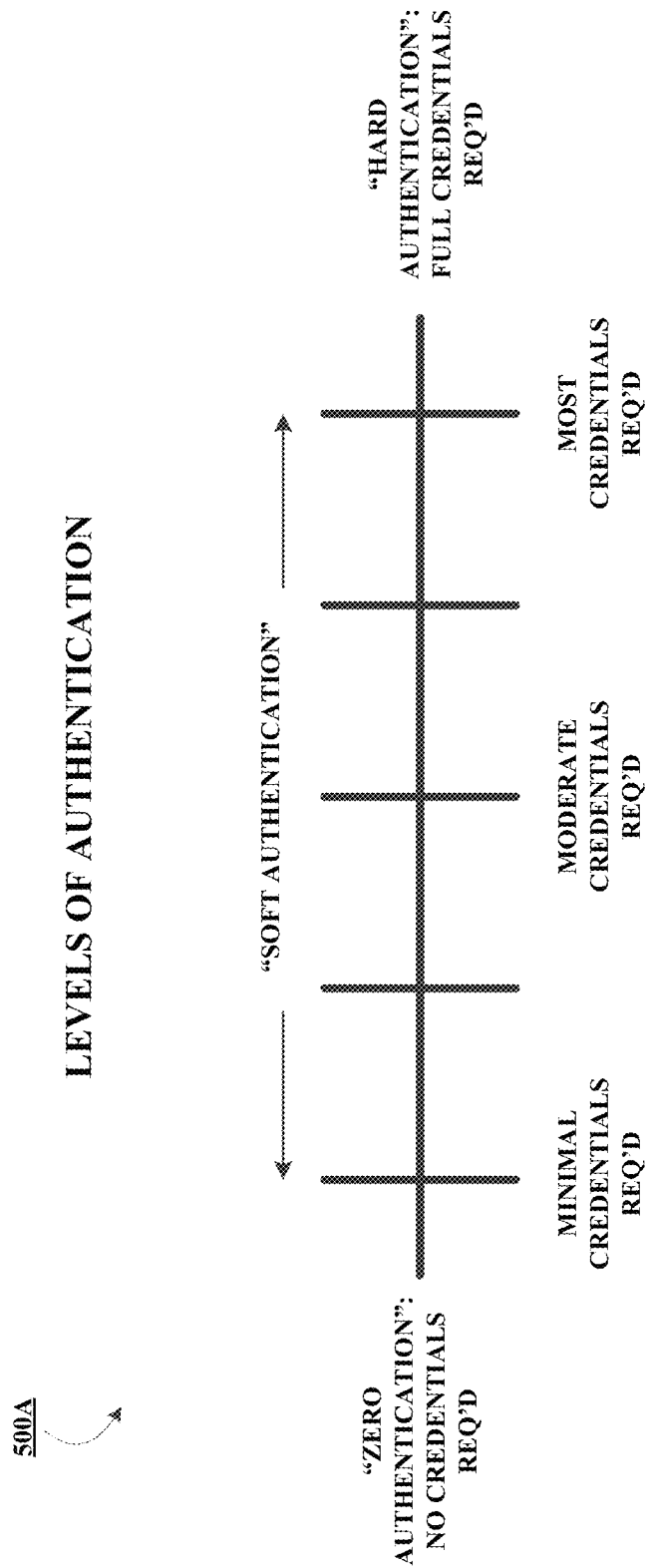
Figure 5B:
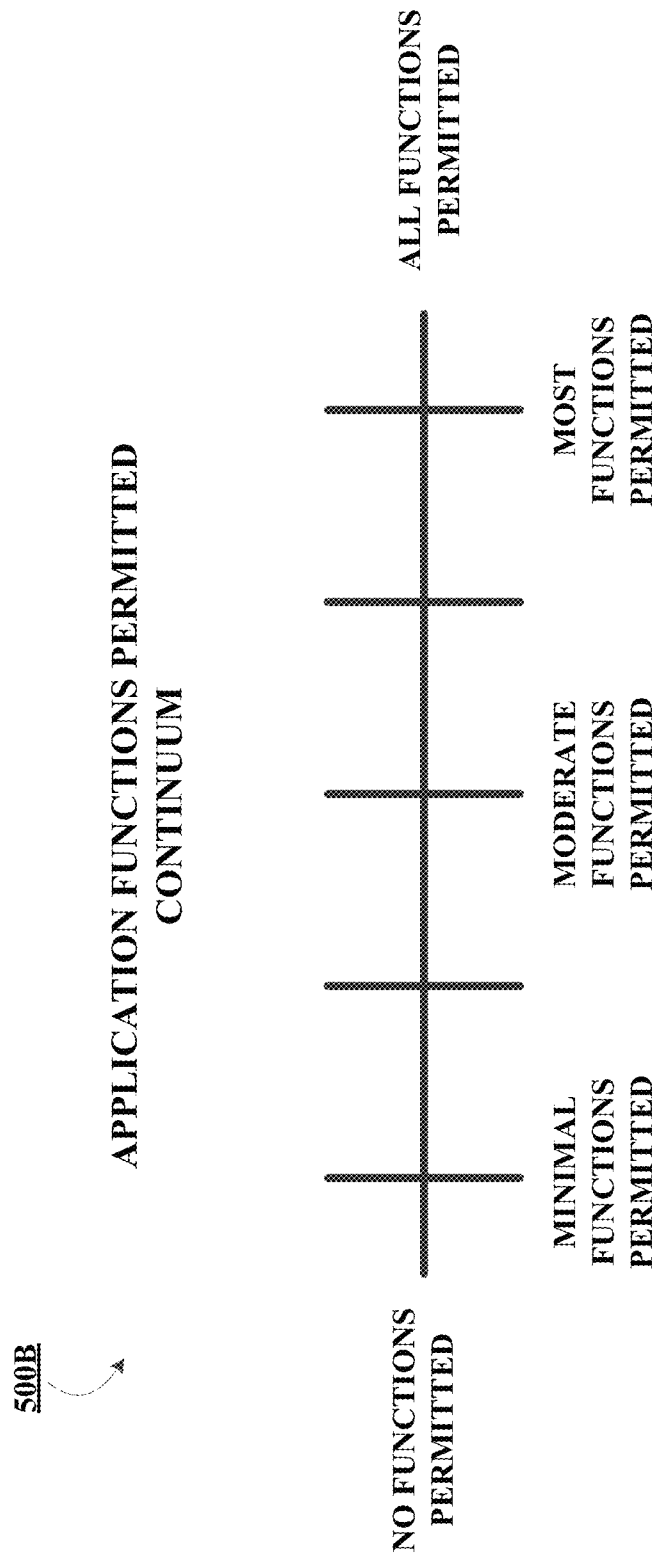
Figure 5C:
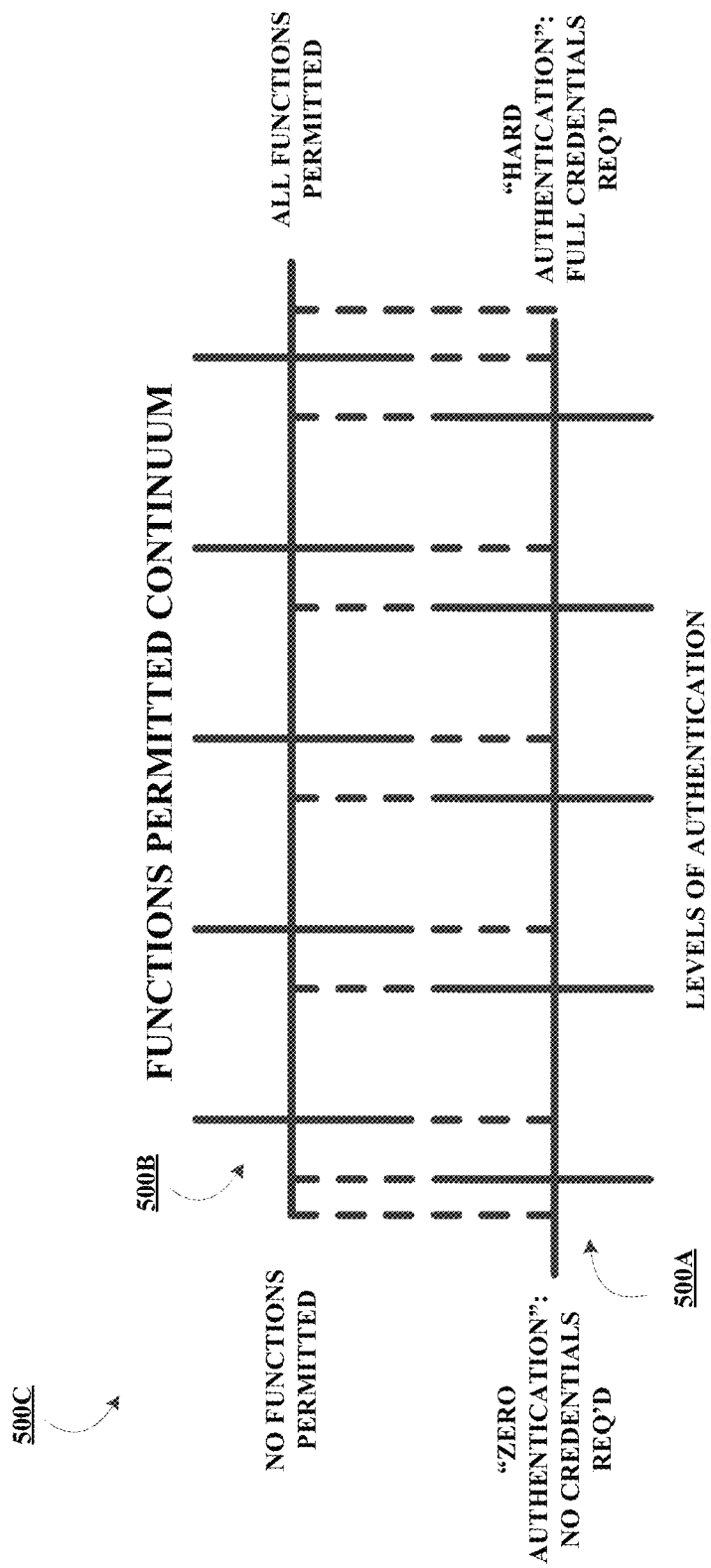
Figure 5D:
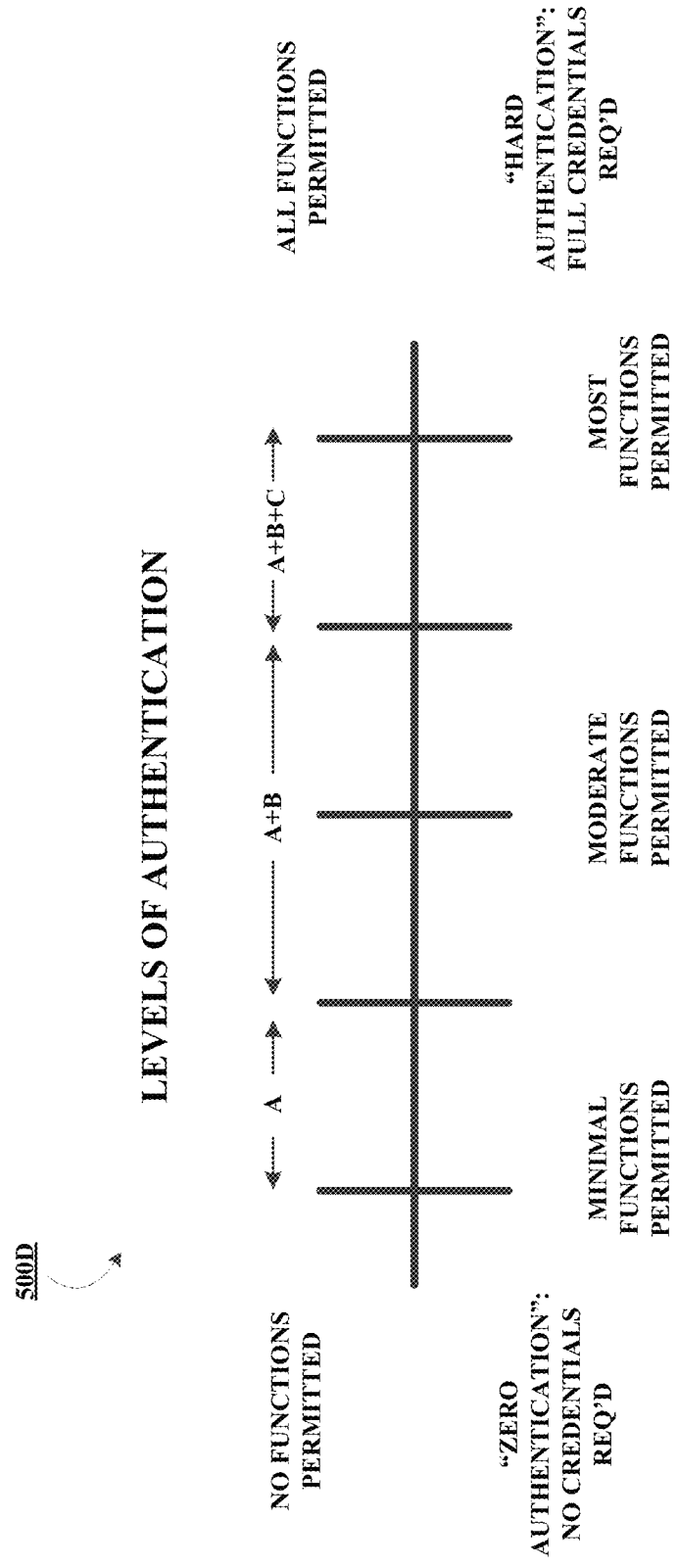
Figure 6:
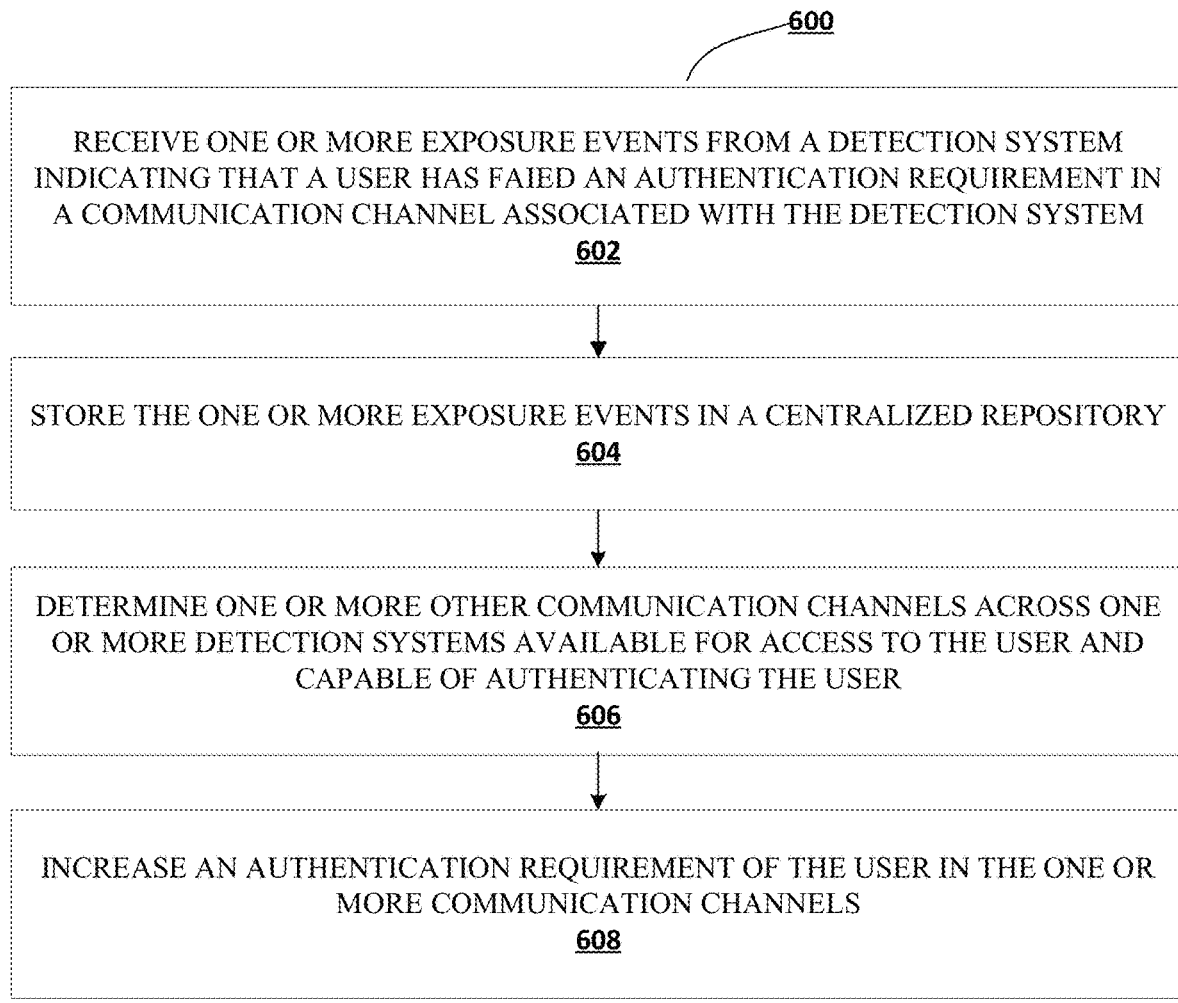

Having thus described embodiments of the invention in general terms, reference will now be made the accompanying drawings, wherein:

FIG. 1 presents an exemplary block diagram of the system environment for cross platform user event recordation, in accordance with an embodiment of the invention;

FIG. 2 illustrates an intrusion detection system model, in accordance with an embodiment of the invention;

FIG. 3 illustrates a process flow for a system for aggregating user event record cross multiple platforms in a technology environment, in accordance with an embodiment of the invention;

FIG. 4 illustrates a process flow for retraining the machine learning algorithm to generate a score for an exposure event 400, in accordance with an embodiment of the invention;

FIGS. 5A, 5B, 5C, and 5D illustrate a continuum of authentication and functions permitted under each authentication level of the continuum of authentication, in accordance with an embodiment of the invention; and FIG. 6 illustrates a process flow for an elevated authentication model based on cross-channel data, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 presents an exemplary block diagram of the system environment for cross platform user event recordation, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports, may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur other transceivers (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Entities typically offer a wide variety of services to assist individuals on a daily basis. In providing these services, the entities manage a vast amount of data flowing through their technology environment. Advances in technology has made possible the use of digital platforms to deliver an increasing range and volume of services, which often carries significant cost savings as well as providing a potential entry point into the industry for recipients. For example, in a financial industry, traditional banking activities and programs that were only available to customers when physically inside a bank branch has been digitized (moved online). Activities like money deposits, withdrawals, and transfers, checking/ saving account management, applying for financial products, loan management, bill pay, account services, or the like have been digitized enabling customer access at all times. This has resulted in unfavorable elements attempting to access unauthorized information using the vulnerabilities of the technology environment in the entity.

To battle this intrusion, entities typically employ multiple exposure identification teams. However, in large organizations with a technology environment spanning multiple geographic locations, the various exposure identification teams operate in individual silos lacking the coordination and control required to maximize the identification and quarantine of potential authorized intrusions. Each team implements its own exposure identification strategy using individual exposure detection systems unique to its purpose. In this regard, each team looks for specific target points and indicators for exposure within their detections system. To this extent, these detections systems may be configured to identify indicators that indicate a possible exposure and raise a "red-flag" if the exposure raises to a level that requires additional review. However, an exposure detected in one team may also be an applicable exposure in another team. In some cases, the lack of coordination between these teams within the entity may cause one team to potentially miss an indicator when not received directly by the detection system of that team, but received by the detection system of other teams.

The present invention provides a functional benefit of enabling individual detections systems within each exposure identification teams to communicate and coordinate more efficiently to detect potential unauthorized intrusions.

FIG. 2 illustrates an intrusion detection system model 200, in accordance with an embodiment of the invention. As shown in FIG. 2, each detections system 140 may be configured to look for and identify indicators within the parameters specific to its exposure identification teams. In some embodiments, each detection system 140 may be configured to transmit each identified exposure event to be stored in a central repository 106 associated with the system 120. In one aspect, the central repository 106 may be configured to establish a communication link with each of the one or more detection systems 140 capable of transmitting and receiving information.

In some embodiments, every exposure event detected by the detection systems 140 may be stored on the central repository 106. While most of the exposure events may, by themselves, not raise to the level of a red-flag, the present invention provides the functional benefit of implementing an analytical machine learning model to process these exposure events to determine whether any combination of exposure events raise to the level of a red-flag. In doing so, the present invention also enables a retraining of the machine learning algorithm used to determine whether each exposure event (or a combination thereof) raises to the level of a red-flag.

In some embodiments, each detection system 140 is connected to the central repository 106 in a passive manner. Each time a detection system identifies an exposure event, the system may be configured to transform the passive connection between the detection system 140 and the central repository 106 into an active connection, thereby enabling the transmission of data from the detection system 140 to the central repository 106. In this regard, the system may be configured to receive a request to connect to the data channel established between the each of the one or more detection systems 140 and the centralized data repository 106, wherein the one or more detection systems 140 are previously disconnected from the centralized data repository 106. Here, the detection systems 140 connect to the data channel based on at least an incidence of a exposure event in the detection system 140. In response, the system may be configured to connect the one or more detection systems to the centralized data repository 106. In some other embodiments, each detection system 140 is connected to the central repository 106 in an active manner. In this regard, the connection between the central repository 106 and the detection system 140 remains active at all times, capable of data transmission and reception.

FIG. 3 illustrates a process flow for a system for aggregating user event record cross multiple platforms in a technology environment 300, in accordance with an embodiment of the invention. As shown in block 302, the process flow includes receiving an indication that at least one detection system has detected an exposure event. In one aspect, the indication is received via a network of distributed servers that are a part of the technology computing architecture, in which the entity's infrastructure resources are divided over a number of networks, processors, and intermediary devices. In this regard, the infrastructure resources include one or more network management software, which manages and monitors data routing, combining, and allocating network bandwidth, access control, and other core networking processes.

In some embodiments, an exposure event may indicate an unrecognized access to a network, system, application, or other resource. In one aspect, each exposure event comprises a score that is generated and assigned by a machine learning algorithm. In this regard, the system may be configured to use historical exposure events generate a score for the exposure event detected by the detection system. In some embodiments, the system may be configured to determine a level of exposure associated with each exposure event and its contribution to the overall intrusion when combined with one or more other exposure events raising the overall level of exposure to a red-flag and/or potential intrusions. By way of one example, training sets for use in machine learning processing can be created from exposure events that have been deemed to be potential intrusions in the past and exposure events that have been deemed to not be potential intrusions. In addition, the machine learning algorithm may incorporate the number of times and/or frequency with which the exposure events have been determined to be potential intrusions.

The machine learning/modeling techniques used herein may include but are not limited to linear regression, logistic regression, neural networks, support vector machines, decision trees, and their derivatives. In practice, one technique can be used in the research effort to provide insights for another machine learning/modeling technique. Thus, a combination of techniques can be used in the analysis and in the product implementation. Once the machine learning algorithm/modeling structure and method is determined, the algorithm is trained based on the historical exposure events adaptively. The parameters of the algorithm "learn" or automatically adjust to behavioral patterns in the historical data and generalize these patterns for detection purposes. When a new exposure event is scored, the algorithm typically generates a score to evaluate the exposure event and associated potential intrusion based on what it has learned in its training history. The algorithmic structure and technique used for this purpose may be adjusted in the training process recursively. The listing of machine learning/modeling structures and techniques listed herein are not exhaustive. Those skilled in the art will appreciate that other predictive modeling structures and techniques may be used in various embodiments. Example predictive modeling structures and techniques may include genetic algorithms, hidden Markov models, self-organizing maps, and dynamic Bayesian analysis.

Next, the process flow includes determining whether the detected exposure event meets the threshold level of a red-flag indicating a potential intrusion, as shown in block 304. In some embodiments, the scores associated with each exposure event may be compared to a predetermined score associated with a threshold level to determine whether the detected exposure event meets the threshold level of a red-flag. In one aspect, the detected exposure event, individually, may be determined to meet the threshold level of a red-flag. In response, the system may be configured to quarantine the exposure event for elevated review to determine whether the potential intrusion is an actual intrusion. In another aspect, the detected exposure, individually, may not be determined to meet the threshold level of a red-flag. In some embodiments, the score required to meet the threshold level of a red-flag may be generated by the machine learning algorithm based on historical occurrences of potential intrusions by same or similar exposure events. In some other embodiments, the score required to meet the threshold level of a red-flag may be assigned by a user. In yet another embodiment, the score required to meet the threshold level of a red-flag may be generated based on a combination of the machine learning algorithm and user input.

Next, the process flow includes transferring the exposure event from a database associated with the detection system to a centralized repository, as shown in block 306. As described herein, the centralized repository may be operatively and selectively connected to the detection systems. Each time a detection system encounters an exposure event, the system may be configured to enable the detection system to transmit information associated with the exposure event. In one aspect, the information associated with the exposure event may include a category associated with the exposure event. For example, if the exposure event includes an incoming telephone call from an alleged customer who provided wrong identification information, the exposure event may be categorized under "incorrect authentication credentials." In another aspect, the exposure event may be categorized into multiple categories simultaneously. In the previous example, the exposure event may be categorized into "incorrect authentication credentials" and "incoming phone call."

In some embodiments, the categories may be predetermined in an attempt to provide consistency among various exposure events. In one aspect, the categories may be generated dynamically within each detection system and included in the information transmitted to the central repository. In this way, when the central repository receives the information, the system may be configured to reconcile the exposure events based on the received categories. In this regard, the system may be configured to determine whether previous received exposure events received from the detection systems are more applicably categorized into the category of the recently received exposure event. In another embodiment, the system may be configured to determine whether the recently received exposure event is more applicably categorized into other categories associated with previously received exposure events. In response, the system may be configured to re-categorize the exposure event accordingly. In some embodiments, the system may be configured to categorize the exposure event as they are received by the detection system. In another embodiment, the system may be configured to categorize the event in the central repository once the information associated with the exposure event has been received.

Next, as shown in block 308, the process flow includes executing statistical algorithms to determine whether any combination of exposure events stored in the centralized data repository meets the threshold level of a red-flag indicating a potential intrusion. In some embodiments, the system may be configured to determine whether any combination of exposure events categorized under the same category meets the threshold level of a red-flag indicating a potential intrusion. In some other embodiments, the system may be configured to determine whether any combination of exposure events across multiple categories meets the threshold level of a red-flag indicating a potential intrusion. In one aspect, the system may be configured to execute the statistical algorithms on the one or more exposure events stored in the centralized repository continuously to determine whether the combination of at least a portion of the one or more exposure events is associated with the intrusion. In another aspect, the system may be configured to execute the statistical algorithms on the one or more exposure events stored in the centralized repository periodically.

In some embodiments, the system may be configured to store the information associated with the exposure events in the centralized data repository until a pattern associated with a potential intrusion is detection. In this regard, the information associated with the exposure events may be stored in the centralized repository until the statistical algorithms detect a combination of exposure events meeting the threshold level of a red-flag that includes the exposure events.

In some embodiments, the system may be configured to combine the scores associated with the exposure events stored in the centralized repository to determine whether the exposure events, in combination, meet the threshold level of a red-flag. In one aspect, each detection system may employ a system specific taxonomy to generate a score for each received exposure event. In this regard, the system may be configured to normalize or standardize the scores received from the detection systems prior to aggregating them to adjust values measured on different scales to a notionally common scale.

In some embodiments, the system may be configured to implement statistical algorithms, i.e., a set of heuristics and calculations to create a model from the exposure events stored in the central repository. In this regard, the system may be configured to analyze the exposure events to identify specific types of patterns or trends in the exposure events to determine whether any combination of the exposure events raise to meet the level of a red-flag. In some embodiments, the system may be configured to use the results of this analysis over multiple iterations to find the optimal parameters for creating a model. These parameters are then applied across the all the exposure events to extract actionable patterns and detailed statistics. In one aspect, the parameters used to create the model may include, but are not limited to individual scores associated with the exposure event, the one or more categories associated with the exposure event, the frequency of incidence of the exposure events, and/or the like. In some embodiments, the statistical algorithm may include, but is not limited to classification algorithms, regression algorithms, segmentation algorithms, association algorithms, sequence analysis algorithms, and/or the like. The listing of statistical algorithms and techniques listed herein are not exhaustive. Those skilled in the art will appreciate that other statistical algorithms and techniques may be used in various embodiments.

Next, as shown in block 310, the process flow includes transmitting the combination of exposure events that meet the threshold level of the red-flag to a user computing device for additional review. In one aspect, the user computing system may be at least one of the one or more detection systems. In one aspect, the system may be configured to initiate a presentation of a graphical user interface for display on the one or more detection systems. In this regard, the graphical user interface may include information associated with the combination of exposure events that met the threshold level of a red-flag. In some embodiments, the one or more detection system may be the detection systems that initially detected the individual exposure events associated with the combination of exposure events. In some other embodiments, the system may be configured to initiate the presentation of the graphical user interface for display on all the detection systems connected to the central repository. In yet another embodiment, the system may be configured to initiate the presentation of the graphical user interface for display on a computing device independent of the detection systems.

In response, a user associated with the entity may view the notification to initiate an elevated review of the combination of exposure events to determine whether there is an actual intrusion. In some embodiments, the user may execute one or more assessment applications on the exposure events to determine whether any combination of the exposure events indicate an actual intrusion. In this regard, the system may be configured to move the one or more exposure events associated with the potential intrusion from the centralized data repository into a volatile memory location. Once moved, the system may then be configured to deploy the one or more assessment applications on the exposure events stored in the volatile memory location, whereby the assessment application are configured to execute scripts to determine whether the potential intrusion is an actual intrusion, i.e., benign or harmful. In some embodiments, determining whether any combination of the exposure events indicate an actual intrusion may involve manual intervention. In yet another embodiment, the system may be configured to determine whether any combination of the exposure events indicate an actual intrusion may involve a combination of results from the assessment applications and manual input from the user. After further analysis, the system may be configured to receive an indication as to whether the combination of exposure events that meet the threshold level of a red-flag are actual intrusions.

FIG. 4 illustrates a process flow for retraining the machine learning algorithm to generate a score for an exposure event 400, in accordance with an embodiment of the invention. As shown in block 402, the process flow includes receiving a user input indicating whether the potential intrusion is an actual intrusion after review of the combination of the exposure events. This user input may be in the form of a binary input indicating whether a particular combination of exposure events resulted in an actual threat. This information is then used to retrain the machine learning algorithm that determines the scores of the individual exposure events. As shown in block 404, the process flow includes augmenting the training data associated with the machine learning algorithm with the user input. In this way, the system may be configured to reassign scores to the exposure events based on the retraining. This score may then be assigned to same or similar exposure events received by the one or more detection systems in the future. In this way, when the statistical modeling is used to detect patterns in future exposure events, the likelihood of a combination of exposure events that meet the level of a red-flag being an actual intrusion increases. Effectively, the system may be configured to continuously retrain the machine learning algorithm aiming to remove the need for additional assessment once the combination of exposure events have been determined to meet the threshold level of a red-flag, automatically indicating that the combination of exposure events indicate an actual intrusion.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 5A, a continuum of authentication 500A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required, type of credentials, and/or the relative strength of the credentials required for that point on the continuum. As discussed below with reference to FIG. 5C, the continuum of authentication 500A may be coupled with an application functions permitted continuum 500B, first illustrated in FIG. 5B.

Referring to FIG. 5B, the application functions permitted continuum 500B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/or number of functions that are permitted and/or the context in which certain functions are permitted.

Referring now to FIG. 5C, a diagram 500C illustrates a coupling of the application functions permitted continuum 500B and the levels of authentication continuum 500A. As shown, the continua 500B and 500A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 500B provides that a particular function or functions may be permitted given that a specified level of authentication credentials are supplied, as indicated by the corresponding point on continuum 500A. For example, a financial institution and/or a user may arrange the continua 500B and 500A with respect to one another and may adjust the arrangement based on changing desires or goals.

In some embodiments, one or both the continua 500B and 500A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 5D, a diagram 500D illustrates a relationship between the functions permitted and the authentication types. As shown in FIG. 5D, the soft authentication continuum between zero authentication and hard authentication may include one or more authentication types (A, B, C in the Figure). In one aspect, the one or more authentication types corresponding to the one or more authentication credentials received from the user and one or more functions associated with the application permitted for user access are positively correlated. For example, a username may enable the user to gain access to checking balance, a username and password may enable the user to gain access to checking balance, funds transfer between the user's first bank account and second bank account, and downloading previous statements, and a username, password and challenge question may enable the user to gain complete access to all the application functions. In one aspect, the user may have to provide authentication credentials corresponding to authentication types A and B to gain access to moderate functions associated with the application. For example, the user may provide a username and password to access a balance check and funds transfer. In another aspect, the user may have to provide authentication credentials corresponding to authentication types A, B, and C to gain access to most function associated with the application. For example, the user may provide a username, password, and a personal identification number to access a balance check, a funds transfer, a deposit, and a bill-pay. In yet another aspect, the user may have to only provide authentication credentials corresponding to authentication type A to gain access to minimal functions associated with the application. For example, the user may provide a username to access a balance check.

FIG. 6 illustrates a process flow for an elevated authentication model based on cross-channel data 600, in accordance with an embodiment of the invention. Most entities enable the user to provide credentials via one or more channels associated with the entity. For example, a user may either enter a username/password via an application on a mobile device, in person to an employee at an entity service location, by calling in to the customer service telephone line, using one or more input devices such as a fingerprint scanner, camera capable of face recognition, microphone capable of voice recognition, and/or the like.

As shown in block 602, the process flow includes receiving one or more exposure events from a detection system indicating that a user has failed an authentication requirement in a communication channel associated with the detection system. In some embodiments, the authentication requirement is associated with the user access to one or more functions associated with one or more applications. For example, a user may have to provide a two-step verification process (hard authentication) to access the online banking application associated with a financial institution to access funds transfer functionality. In this example, the user interface associated with the online banking application is a communication channel. In one aspect, the one or more detection systems are configured to monitor the one or more communication channels used by the user for authentication each time the user attempts to access the one or more applications. In some other embodiments, the system may be configured to enable the one or more detection systems based on a trigger event indicating the user's use of a communication channel to access the applications.

In response, the system may be configured to store the one or more exposure events in the centralized repository, as shown in block 604. In doing so, the system may be configured to enable the detection system to transmit information associated with the exposure event (including the failed authentication by the user) to the centralized repository, thereby making the information accessible to the other detection systems connected to the centralized repository. In response, the system may be configured to determine one or more other communication channels across one or more detection systems available for access to the user and capable of authenticating the user, as shown in block 606. For example, the user, after failing the authentication requirement required to access certain features associated with the online banking application, may be able to contact the financial institution via their customer service number. The user may then be able to provide authentication credentials to an employee at the financial institution over the phone. In response to the authentication credentials being validated by the employee, the user may then execute one or more actions he/she would have otherwise executed by accessing the online banking application.

Next, as shown in block 608, the process flow includes increasing an authentication requirement of the user in the one or more communication channels. In some embodiments, increasing the authentication requirement of the user further comprises increasing the authentication level required to enable the user to access at least one of the one or more functions associated with the applications. As described in the previous example, once the user fails authentication requirement while attempting to access the online banking application, the system may be configured to increase the authentication requirement for the user to access same or similar functions associated with one or more applications or one or more services offered by the financial institution. In some embodiments, the system may be configured to increase the authentication requirement by various orders of magnitude based on the communication channel. For example, if the user fails the authentication requirement while attempting to access the online banking application, the system may be configured to increase the authentication requirement for other banking applications stored on the same mobile device two-fold, while retaining the authentication requirement required for the user to access the functions in person at a banking facility, and increasing the authentication requirement for the user to access the functions by contacting the customer service number associated with the financial institution by an order of magnitude.

As described above, an increase in the authentication requirement, in some embodiments, may include increasing an authentication level. In this regard, the system may be configured to increase the authentication level from a soft authentication requirement to a hard authentication requirement. In some other embodiments, the system may be configured to increase the authentication requirement by requiring a different type of authentication credential. For example, if the user typically provides a username/password to access one or more functions in the online banking application, in response to the user failing the authentication requirement, the system may be configured to require a biometric authentication input either instead of or in addition to the username/password requirement to access the same functions.

In some embodiments, the system may be configured to receive one or more authentication credentials from the user based on the increased authentication requirement. In response, the system may be configured to validate the one or more authentication credentials. In one aspect, if the authentication credentials were provided to an employee of the entity, the system may be configured to receive an indication from the employee once the user's credentials are validated. In response to validating the authentication credentials of the user, the system may be configured to determine that the user is authorized to access the one or more functions associated with the one or more functions. Once the user is authorized, the system may then be configured to restore the authentication requirement of the user in the one or more other communication channels.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 8049US1.014033.3088 | To be assigned | SYSTEM FOR ACROSS RAIL SILO SYSTEM INTEGRATION AND LOGIC REPOSITORY | Concurrently herewith |
| 8052US1.014033.3091 | To be assigned | CROSS CHANNEL AUTHENTICATION ELEVATION VIA LOGIC REPOSITORY | Concurrently herewith |

What is claimed is:

1. A system for cross platform user event aggregation, the system comprising:
    at least one non-transitory memory device with computer-readable code stored thereon;
    at least one processing device; and
    at least one module stored in said memory device and comprising instruction code that is executable by the at least one processing device and configured to cause said at least one processing device to:
        receive, via a distributed network of servers, one or more exposure events from one or more detection systems, wherein each of the one or more exposure events is associated with a score, wherein the score for each of the one or more exposure events is assigned by a machine learning algorithm;
        retrieve information associated with the one or more exposure events from the one or more detection systems;
        store the information in a centralized data repository;
        generate a prediction model using one or more parameters from the one or more exposure events stored in the centralized data repository to identify a pattern in the one or more exposure events, wherein the one or more parameters comprises at least the score associated with each of the one or more exposure events and a frequency of incidence of the one or more exposure events;

determine, using the prediction model, that a combination of at least a portion of the one or more exposure events indicates an intrusion in a first detection system, wherein the first detection system is associated with the one or more detection systems, thereby requiring elevated review of each exposure event in the combination of at least a portion of the one or more exposure events;

initiate the elevated review based on at least the indication of the intrusion;

determine whether the intrusion is benign or harmful; and re-train the machine learning algorithm based on at least determining whether the intrusion is benign or harmful, thereby adjusting the score for future incidents of each exposure event in the combination of at least a portion of the one or more exposure events.

2. The system of claim 1, wherein determining the combination of at least a portion of the one or more exposure events that indicated the intrusion further comprises:

storing the information in the centralized data repository until a pattern associated with the intrusion based on the one or more exposure events is detected; and determining the pattern associated with at least a portion of the one or more exposure events, wherein the pattern comprises the combination of at least a portion of the one or more exposure events.

3. The system of claim 2, wherein the module is further configured to:

continuously execute statistical analysis algorithms on the one or more exposure events stored in the centralized data repository to determine whether the combination of at least a portion of the one or more exposure events is associated with the intrusion.

4. The system of claim 1, wherein the module is further configured to:

initiate the elevated review, wherein initiating further comprises moving the one or more exposure events associated with the intrusion from the centralized data repository to a computing device associated with a user;

initiate a presentation of a user interface for display on the computing device, wherein the user interface comprises information associated with each exposure event associated with the intrusion; and receive, via the user interface, a user input indicating whether the intrusion is benign or harmful.

5. The system of claim 1, wherein the module is further configured to:

initiate the elevated review, wherein initiating further comprises moving the one or more exposure events associated with the intrusion from the centralized data repository to a volatile memory location;

deploy one or more assessment applications on the one or more exposure events stored in the volatile memory location, wherein the one or more assessment applications are configured to execute scripts to determine whether the intrusion is benign or harmful; and receive from the one or more assessment application an indication of whether the intrusion is benign or harmful.

6. The system of claim 1, wherein the module is further configured to:

establish a communication link between the one or more detection systems and the centralized data repository, wherein establishing further comprises establishing a data channel between each of the one or more detection systems and the centralized data repository.

7. The system of claim 6, wherein receiving the one or more exposure events from the one or more detection systems further comprises:

receiving a request to connect to the data channel established between the each of the one or more detection systems and the centralized data repository, wherein the one or more detection systems are previously disconnected from the centralized data repository, wherein the one or more detection systems connect to the data channel based on at least an incidence of a exposure event in the detection system, wherein the exposure event is associated with the one or more exposure events; and connecting the one or more detection systems to the centralized data repository based on at least the received request.

8. The system of claim 1, wherein determining that the intrusion is benign further comprises determining, based on the elevated review, that the intrusion is not an actual threat.

9. The system of claim 1, wherein determining that the intrusion is harmful further comprises determining, based on the elevated review, that the intrusion is an actual threat.

10. A computer implemented method for cross platform user event aggregation, the method comprising:

receiving, via a distributed network of servers, one or more exposure events from one or more detection systems, wherein each of the one or more exposure events is associated with a score, wherein the score for each of the one or more exposure events is assigned by a machine learning algorithm;

retrieving information associated with the one or more exposure events from the one or more detection systems;

storing the information in a centralized data repository;

generating a prediction model using one or more parameters from the one or more exposure events stored in the centralized data repository to identify a pattern in the one or more exposure events, wherein the one or more parameters comprises at least the score associated with each of the one or more exposure events and a frequency of incidence of the one or more exposure events;

determining, using the prediction model, that a combination of at least a portion of the one or more exposure events indicates an intrusion in a first detection system, wherein the first detection system is associated with the one or more detection systems, thereby requiring elevated review of each exposure event in the combination of at least a portion of the one or more exposure events;

initiating the elevated review based on at least the indication of the intrusion;

determining whether the intrusion is benign or harmful; and re-training the machine learning algorithm based on at least determining whether the intrusion is benign or harmful, thereby adjusting the score for future incidents of each exposure event in the combination of at least a portion of the one or more exposure events.

11. The method of claim 10, wherein determining the combination of at least a portion of the one or more exposure events that indicated the intrusion further comprises:

storing the information in the centralized data repository until a pattern associated with the intrusion based on the one or more exposure events is detected; and determine the pattern associated with at least a portion of the one or more exposure events, wherein the pattern comprises the combination of at least a portion of the one or more exposure events.

12. The method of claim 11, wherein the method further comprises:
continuously execute statistical analysis algorithms on the one or more exposure events stored in the centralized data repository to determine whether the combination of at least a portion of the one or more exposure events is associated with the intrusion.

13. The method of claim 10, wherein the method further comprises:
initiating the elevated review, wherein initiating further comprises moving the one or more exposure events associated with the intrusion from the centralized data repository to a volatile memory location;
deploying one or more assessment applications on the one or more exposure events stored in the volatile memory location, wherein the one or more assessment applications are configured to execute scripts to determine whether the intrusion is benign or harmful; and
receiving from the one or more assessment application an indication of whether the intrusion is benign or harmful.

14. The method of claim 10, wherein the method further comprises:
establishing a communication link between the one or more detection systems and the centralized data repository, wherein establishing further comprises establishing a data channel between each of the one or more detection systems and the centralized data repository.

15. The method of claim 14, wherein receiving the one or more exposure events further comprises:
receiving a request to connect to the data channel established between the each of the one or more detection systems and the centralized data repository, wherein the one or more detection systems are previously disconnected from the centralized data repository, wherein the one or more detection systems connect to the data channel based on at least an incidence of a exposure event in the detection system, wherein the exposure event is associated with the one or more exposure events; and
connecting the one or more detection systems to the centralized data repository based on at least the received request.

16. A computer program product for cross platform user event aggregation, the computer program product comprising a non-transitory computer-readable medium comprising code causing a first apparatus to:
receive, via a distributed network of servers, one or more exposure events from one or more detection systems, wherein each of the one or more exposure events is associated with a score, wherein the score for each of the one or more exposure events is assigned by a machine learning algorithm;
retrieve information associated with the one or more exposure events from the one or more detection systems;
store the information in a centralized data repository;
generate a prediction model using one or more parameters from the one or more exposure events stored in the centralized data repository to identify a pattern in the one or more exposure events, wherein the one or more parameters comprises at least the score associated with each of the one or more exposure events and a frequency of incidence of the one or more exposure events;
determine, using the prediction model, that a combination of at least a portion of the one or more exposure events indicates an intrusion in a first detection system, wherein the first detection system is associated with the one or more detection systems, thereby requiring elevated review of each exposure event in the combination of at least a portion of the one or more exposure events;
initiate the elevated review based on at least the indication of the intrusion;
determine whether the intrusion is benign or harmful; and
re-train the machine learning algorithm based on at least determining whether the intrusion is benign or harmful, thereby adjusting the score for future incidents of each exposure event in the combination of at least a portion of the one or more exposure events.

17. The computer program product of claim 16, wherein determining the combination of at least a portion of the one or more exposure events that indicated the intrusion further comprises:
storing the information in the centralized data repository until a pattern associated with the intrusion based on the one or more exposure events is detected; and
determining the pattern associated with at least a portion of the one or more exposure events, wherein the pattern comprises the combination of at least a portion of the one or more exposure events.

18. The computer program product of claim 17, wherein the first apparatus is further configured to:
continuously execute statistical analysis algorithms on the one or more exposure events stored in the centralized data repository to determine whether the combination of at least a portion of the one or more exposure events is associated with the intrusion.

19. The computer program product of claim 16, wherein the first apparatus is further configured to:
initiate the elevated review, wherein initiating further comprises moving the one or more exposure events associated with the intrusion from the centralized data repository to a computing device associated with a user;
initiate a presentation of a user interface for display on the computing device, wherein the user interface comprises information associated with each exposure event associated with the intrusion; and
receive, via the user interface, a user input indicating whether the intrusion is benign or harmful.

20. The computer program product of claim 16, wherein the first apparatus is further configured to:
establish a communication link between the one or more detection systems and the centralized data repository, wherein establishing further comprises establishing a data channel between each of the one or more detection systems and the centralized data repository.

* * * * *